US012090686B2

(12) United States Patent
Eriksen et al.

(10) Patent No.: US 12,090,686 B2
(45) Date of Patent: Sep. 17, 2024

(54) MOULD ALIGNER FOR A WIND TURBINE BLADE SHELL MOULD INCLUDING A FREELY ROTATING SPINNER ELEMENT

(71) Applicant: LM WIND POWER A/S, Kolding (DK)

(72) Inventors: Johnny Eriksen, Kolding (DK); Silviu Gabriel Hanachiuc, Kolding (DK); Poul Jakobsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 525 days.

(21) Appl. No.: 17/428,684

(22) PCT Filed: Feb. 14, 2020

(86) PCT No.: PCT/EP2020/053847
§ 371 (c)(1),
(2) Date: Aug. 5, 2021

(87) PCT Pub. No.: WO2020/165391
PCT Pub. Date: Aug. 20, 2020

(65) Prior Publication Data
US 2022/0111561 A1 Apr. 14, 2022

(30) Foreign Application Priority Data

Feb. 14, 2019 (EP) ..................................... 19157208

(51) Int. Cl.
*B29C 33/30* (2006.01)
*B29C 33/20* (2006.01)
(Continued)

(52) U.S. Cl.
CPC .......... *B29C 33/303* (2013.01); *B29C 33/202* (2013.01); *B29C 70/54* (2013.01); *B29L 2031/085* (2013.01)

(58) Field of Classification Search
None
See application file for complete search history.

(56) References Cited

U.S. PATENT DOCUMENTS 3,918,861 A * 11/1975 Klose ................. B29D 30/0649
425/47
3,981,671 A * 9/1976 Edwards ............... B29C 44/428
264/DIG. 83
(Continued)

FOREIGN PATENT DOCUMENTS

CN 201357533 Y 12/2009
CN 207772207 U 8/2018
(Continued)

OTHER PUBLICATIONS

European Search Report dated Aug. 22, 2019 corresponding to application No. 19157208.0-1014.

*Primary Examiner* — Jeffrey M Wollschlager
*Assistant Examiner* — Guy F Mongelli
(74) *Attorney, Agent, or Firm* — Nath, Goldberg & Meyer; Jerald L. Meyer; Tanya E. Harkins

(57) ABSTRACT

A mould aligner is used to align and lock a first mould and a second mould for moulding shell parts of a wind turbine blade. The mould aligner includes a first alignment segment configured to be attached to a first mould and a second alignment segment configured to be attached to a second mould. The second alignment segment includes a hydraulic cylinder having a barrel and a piston rod. The piston rod is axially displaceable and rotatable with respect to the barrel. The hydraulic cylinder includes a lock part having a first rod part and a locking element being provided on the first rod part. The first rod part is configured for being received in and engaged in the locking cavity of the first alignment segment.

(Continued)

The hydraulic cylinder includes a cylinder part comprising the barrel and a second rod part having a piston.

16 Claims, 18 Drawing Sheets

(51) Int. Cl.
  *B29C 70/54* (2006.01)
  *B29L 31/08* (2006.01)

(56) References Cited

U.S. PATENT DOCUMENTS

| | | | | |
|---|---|---|---|---|
| 4,653,970 | A | * | 3/1987 | Ballantyne .............. F16B 21/02 29/520 |
| 4,693,679 | A | * | 9/1987 | Marth ................. B29C 45/6728 425/DIG. 221 |
| 4,944,669 | A | * | 7/1990 | Zakich .................... B30B 1/323 425/451.2 |
| 5,439,369 | A | * | 8/1995 | Wang .................. B29C 45/6714 425/589 |
| 5,928,685 | A | * | 7/1999 | Schad ................. B29C 45/6714 425/451.9 |
| 2008/0261468 | A1 | * | 10/2008 | Mueller ................... B63H 1/14 440/50 |
| 2010/0203187 | A1 | * | 8/2010 | Schmid .................. B29C 49/56 425/541 |
| 2014/0306376 | A1 | * | 10/2014 | Tapia ..................... B29C 70/38 264/299 |
| 2017/0266895 | A1 | * | 9/2017 | Kehlenbeck ............ B29C 33/26 |
| 2018/0009177 | A1 | * | 1/2018 | Bendel ................. B29C 66/547 |
| 2020/0307032 | A1 | * | 10/2020 | Burchardt ............. B29C 33/308 |

FOREIGN PATENT DOCUMENTS

| | | |
|---|---|---|
| EP | 3222398 A1 | 9/2017 |
| EP | 3266579 A1 | 1/2018 |
| WO | 2007054088 A1 | 5/2007 |
| WO | 2010103490 A1 | 9/2010 |

* cited by examiner

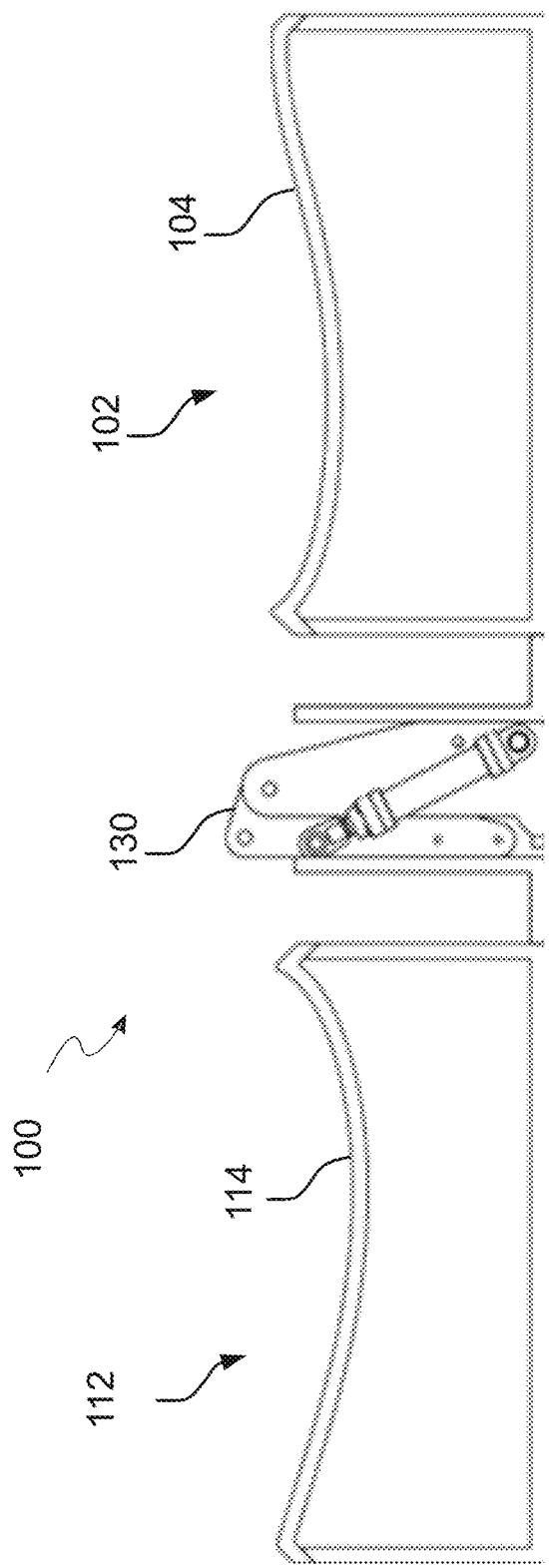

MOULD ALIGNER FOR A WIND TURBINE BLADE SHELL MOULD INCLUDING A FREELY ROTATING SPINNER ELEMENT

This is a National Phase Application filed under 35 U.S.C. 371 as a national stage of PCT/EP2020/053847, filed Feb. 14, 2020, an application claiming the benefit of European Application No. 19157208.0, filed Feb. 14, 2019, the content of each of which is hereby incorporated by reference in its entirety.

FIELD OF THE INVENTION

The present disclosure relates to manufacture of wind turbine blades. More specifically, the present disclosure pertains to the field of a mould aligner, such as a mould aligner for aligning and locking a first mould and a second mould for moulding shell parts of a wind turbine blade, and a blade shell mould comprising a mould aligner.

BACKGROUND OF THE INVENTION

Wind turbine blades of fiber-reinforced polymer and in particular the aerodynamic shells of wind turbine blades are usually manufactured in moulds, where the pressure side shell half part and the suction side shell half part of the blade are manufactured separately by arranging glass fiber mats and/or other fiber-reinforcement material, such as carbon fiber and polymer, in each of the two moulds. Afterwards, one of the moulds are turned upside down and positioned on top of the other mould, and the two halves are adhered together.

It is known for manufacturers of wind turbine blades, when manufacturing blades in two halves, that it is necessary to align the moulds and to lock the two moulds together.

In the current systems one mould is turned and lowered onto the other mould. The mould is then aligned by manually adjusting the mould. Manually adjusting the moulds is imprecise and time and power consuming. Furthermore, the moulds are currently locked in a second operation, e.g. by the means of clamps, which further increases the manufacturing time for a wind turbine blade.

Thus, there is a need for a system for aligning and locking the moulds which reduces the manufacturing time for wind turbine blades and increases the precision of alignment of the moulds.

SUMMARY OF THE INVENTION

It is an object of the present disclosure to provide a mould aligner and a wind turbine blade shell mould comprising a mould aligner, which overcomes at least some of the disadvantages of the prior art.

In particular, it is an object of the present invention to provide a mould aligner and a wind turbine blade shell mould which improves the procedure for moulding of wind turbine blades.

Thus, the present invention relates to a mould aligner for aligning and locking a first mould and a second mould for moulding shell parts of e.g. a wind turbine blade.

The mould aligner comprises a first alignment segment extending along a mould aligner axis from a first primary end to a first secondary end. The first alignment segment is configured to be attached to the first mould. The first alignment segment comprises a locking cavity.

The mould aligner comprises a second alignment segment extending along a mould aligner axis from a second primary end to a second secondary end. The second alignment segment is configured to be attached to a second mould.

The second alignment segment comprises a hydraulic cylinder. The hydraulic cylinder comprises a barrel and a piston rod. The piston rod is axially displaceable and rotatable with respect to the barrel. The hydraulic cylinder comprises a lock part comprising a first rod part and a locking element being provided on the first rod part. The first rod part is configured for being received in and engaged in the locking cavity of the first alignment segment. The hydraulic cylinder comprises a cylinder part comprising the barrel and a second rod part comprising a piston. The hydraulic cylinder comprises a guide part comprising a third rod part, a guide pin and a guide slot. The guide pin engages the guide slot.

The piston rod of the hydraulic cylinder of the second alignment segment is adjustable and movable between a retracted state and an extended state and vice versa. The engagement between the guide pin and the guide slot is configured for providing an angular rotation of the piston rod during a portion of said movement.

The hydraulic cylinder may use pressurized fluid to drive the piston rod. The pressurized fluid may be oil. The hydraulic may be single acting or dual acting.

Also disclosed is a mould system for moulding a blade shell of a wind turbine blade. The mould system comprises a first mould for manufacturing a first blade shell part of the wind turbine blade and a second mould for moulding a second blade shell part of the wind turbine blade. The first mould and second mould extend along a longitudinal axis.

The first mould has a first moulding side with a first moulding surface that defines an outer shape of the first blade shell part and a first non-moulding side opposite the first moulding side. The first moulding surface may be a concave and/or female moulding surface of the first mould.

The second mould has a second moulding side with a second moulding surface that defines an outer shape of the second blade shell part and having a second non-moulding side opposite the second moulding side. The second moulding surface may be a concave and/or female moulding surface of the second mould.

The mould system is configured to position the first mould and the second mould such that the first moulding side is facing the second moulding side and such that the first blade shell part may be adhered to the second blade shell part so as to form the blade shell of the wind turbine blade.

The mould system comprises a plurality of mould aligners according to one or more of the preceding claims and being distributed along at least a part of a lateral side of the mould.

The first alignment segment is attachable, such as fixedly attachable, to the first mould. The second alignment segment is attachable, such as fixedly attachable, to the second mould.

The mould aligners may be evenly distributed on the each of the lateral side of the mould. Distance between mould aligners along the mould may be between 0.5-3 m, such as 1-2 m. The distance between mould aligners may vary between sections of the mould, e.g. the distance between mould aligners may be shorter at the root end of the mould compared to the distance between mould aligners at the tip end of the mould.

It is an advantage of the present disclosure that a mould aligner is provided specifically adapted for aligning and locking a first and a second mould, which provides a more precise alignment of the moulds, which in turn lowers production costs and time.

It is an advantage of the present disclosure that alignment and locking of moulds may provide for a more automated process. It is a further advantage of the present disclosure that alignment and locking of moulds is made easier and more reliable.

The second alignment segment may in a retracted state have a retracted length between the second primary end and the second secondary end and in an extended state have an extended length between the second primary end and the second secondary end. The extended length may be longer than the retracted length. The hydraulic cylinder may be configured to adjust the second alignment segment along the mould aligner axis between the first retracted state and the first extended state.

The guide slot may comprise a first slot part and a second slot part. The first slot part may extend helically about the mould alignment axis and the second slot part may extend in a direction substantially parallel to the mould aligner axis. The first slot part may be located near the barrel and the second slot part may be located near the second secondary end. Alternatively, the second slot part may be located near the barrel and the first slot part may be located near the second secondary end.

The guide slot may be located in a guide pipe and the guide pin may be attached to the third rod part. The guide pin may be in engagement with the guide slot in the guide pipe. The guide slot may define a path of movement of the third rod part. Alternatively, the guide slot may be provided in the surface of the third rod part. Alternatively, the guide slot may be provided on the inner surface of barrel.

The locking element may have an elongated cross sectional shape in a plane perpendicular to the mould aligner axis. The elongated cross sectional shape may have a length and a width, wherein the length is longer than the width. A spinner element may be arranged distal to the locking element and may be freely rotatable with respect to the locking element about an axis parallel to the mould aligner axis. The spinner element may be the load bearing element of the locking element, such that the friction between the locking element and the locking cavity is reduced.

The first alignment segment may comprise an opening slot at the first secondary end. The opening slot may have the same shape as the cross sectional shape of the locking element.

The locking cavity of the first alignment segment may be configured to receive the locking element in a first angular position and to lock the locking element in a second angular position. Locking the locking element may comprise a locking surface being in contact with an inner surface of at least one projection extending across the locking cavity, thereby preventing retraction of the locking element from the locking cavity.

The locking element may have a shape as a cone. The locking cavity may have a conical shape. Alternatively, the locking element may have a concave shape, and the locking cavity may comprise a conical protrusion. The locking element and the locking cavity may have any shape corresponding to a male and a female part.

The hydraulic cylinder may be configured to turn the locking element from a first angular position to a second angular position, thereby locking the locking element in the locking cavity. The angular distance between the first angular position and the second angular position may be between 10-170 degrees, such as 90 degrees.

The locking element may be arranged on the outer end of the first rod part. The locking element may form the tip of the first rod part.

The second alignment segment may comprise at least one height adjusting stop. The height adjusting stop may be configured to stop the translational movement of the first mould towards the second mould. The height adjusting stop may be adjusted to determine the desired height of an adhesive on a flange of a shell part in a mould, e.g. the height of the height adjusting stops may be 10-50 mm, such as 30 mm.

The second alignment segment may comprise at least one position sensor. The sensor may be an inductive sensor.

The mould system may be configured to align and lock the first mould on top of the second mould, such that the first moulding side is facing the second moulding side.

The mould aligners may be arranged such that the mould aligner axis of the first alignment segment is perpendicular to the longitudinal axis of the first mould and the mould aligner axis of the second alignment segment is perpendicular to the second mould. The mould aligner axis of the first alignment segment and the mould aligner axis of the second alignment segment may be in-line when the first mould and second mould are aligned.

Also disclosed is a method for aligning and locking a first mould and a second mould of a mould system for moulding shell parts of a wind turbine blade.

The method comprises providing a first mould and providing a first alignment segment on the first mould. The first alignment segment is attachable, such as fixedly attachable, to the first mould.

The method comprises providing a second mould and providing a second alignment segment on the second mould, wherein the second mould comprises a barrel and a piston rod and wherein the second alignment segment is in an extended position and a locking element on the piston rod is in a first angular position. The second alignment segment is attachable, such as fixedly attachable, to the second mould.

The method comprises bringing the first alignment segment and the second alignment segment into engagement. Bringing the segments into engagement comprises lowering the first alignment segment onto the second alignment segment such that the locking element enters a locking cavity through an opening slot in the first alignment segment.

The method comprises aligning the first mould and the second mould. Aligning the moulds comprises lowering the first mould towards the second mould. The method comprises locking the first mould and the second mould Locking the moulds comprises rotating the locking element to a second angular position, such that the first alignment segment and second alignment segment are interlocked.

Aligning and locking the first mould on top of the second mould may comprise lowering the first mould such that the first aligner segment engages with the second alignment segment in an extended state. Aligning and locking the first mould on top of the second mould may comprise lowering the first mould by retracting the second alignment segment by moving the piston rod and thereby rotating the locking element in the locking cavity of the first aligner segment.

The method may comprise pulling the first mould and the second mould together by pulling the first alignment segment towards the second alignment segment. Pulling may be performed by the means of the hydraulic cylinder.

The first mould may comprise a first mould flange along at least a part of the periphery of the first moulding surface. The first mould flange may be configured to provide a first shell part flange on the first shell part. The second mould may comprise a second mould flange along at least a part of the periphery of the second moulding surface. The second mould flange may be configured to provide a second shell part flange on the second shell part.

The method may comprise adjusting at least one height adjusting stop, such that the height of the height adjusting stop corresponds a desired height of an adhesive on a flange of a shell part in a mould.

Aligning and locking the first mould on top of the second mould may comprise adjusting the height adjusting stop and pulling the first mould until the first mould rests on the height adjusting stop. Alternatively, aligning and locking the first mould on top of the second mould may comprise adjusting the height adjusting stop and lowering the first mould until the first mould rests on the height adjusting stop.

When the adhesive between the shell parts in the moulds has been cured, the first mould may be elevated from the second mould by elevating the first alignment segment. The piston rod will be extended and rotated such that the locking element of the piston rod may be released from the locking cavity of the first alignment segment. The piston rod may be retracted, to e.g. a storing position, until the method starts from the beginning. Such storing position will prevent or at least reduce the risk of the mould aligner obstructing or impeding other work on the mould.

The first mould may be an upwind mould, such as a mould for manufacturing an upwind shell part of the blade shell. The second mould may be a downwind mould, such as a mould for manufacturing a downwind shell part of the blade shell.

The mould system may comprise a positioning device configured to turn and/or position the first mould and/or second mould.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 3a-b is a schematic diagram illustrating an exemplary mould system,

DETAILED DESCRIPTION

In the following figure description, the same reference numbers refer to the same elements and may thus not be described in relation to all figures.

Figure 1:
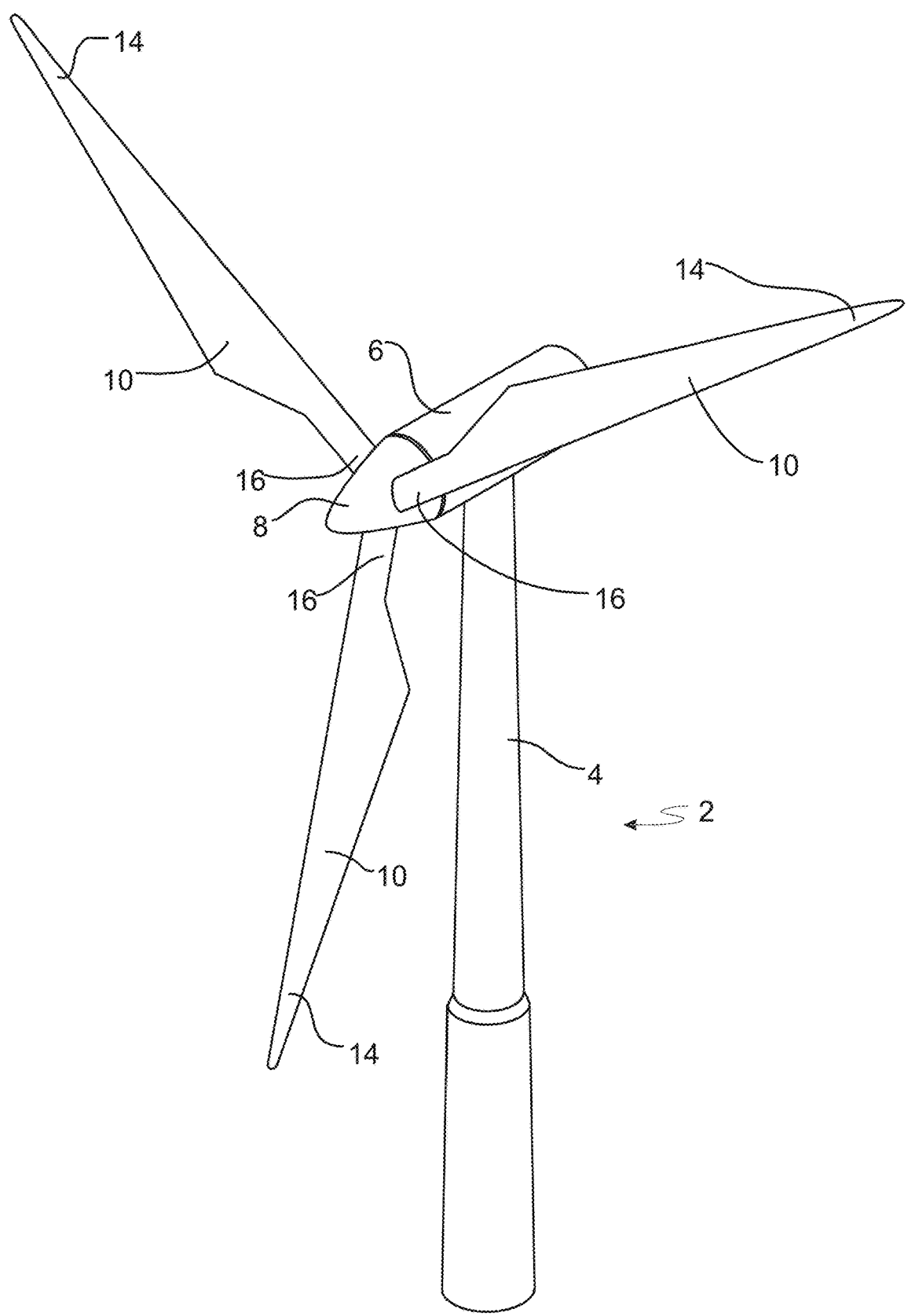
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
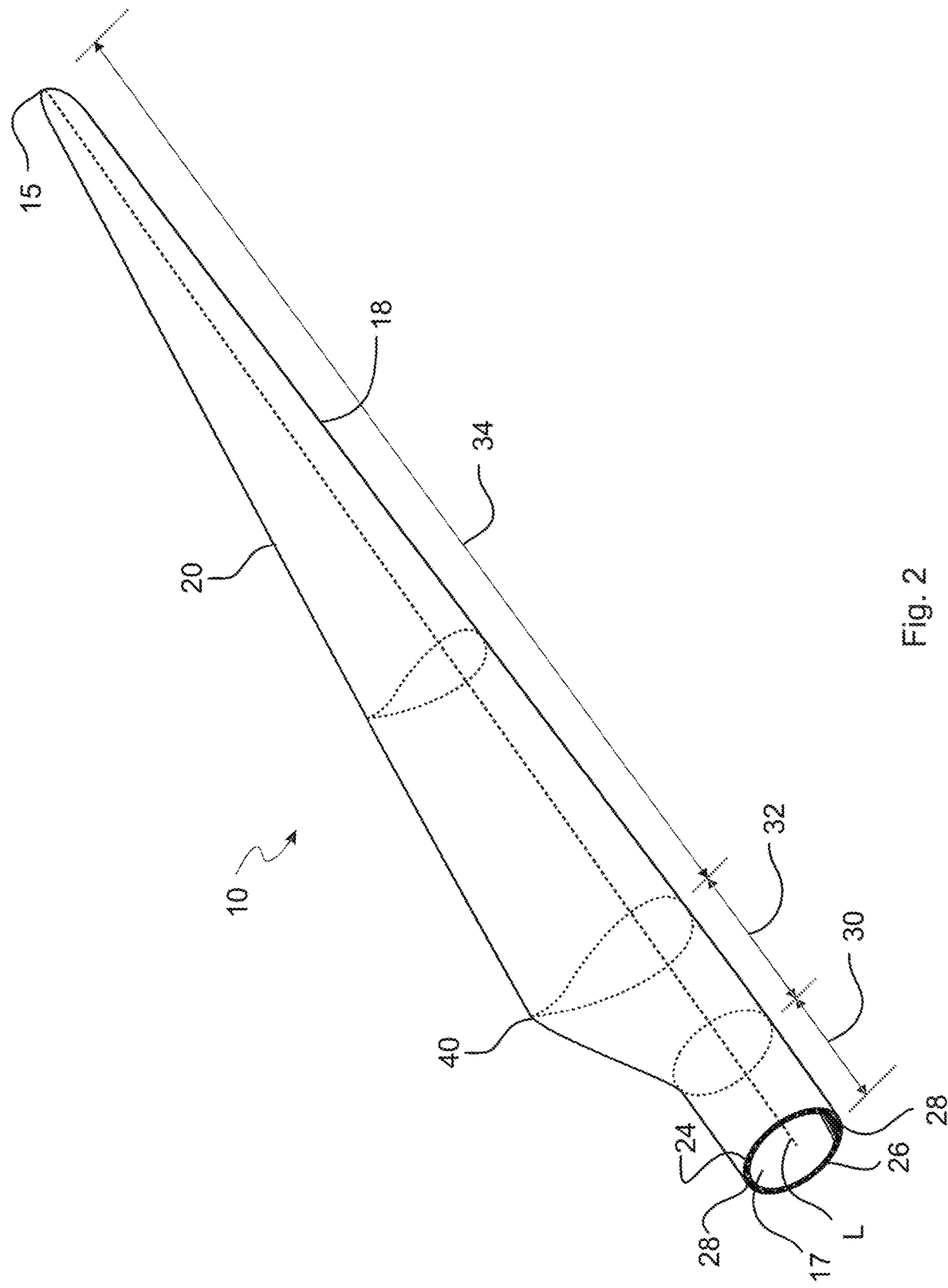
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts, a first blade shell part 24 and a second blade shell part 26, typically made of fiber-reinforced polymer. The first blade shell part 24 is typically a pressure side or upwind blade shell part. The second blade shell part 26 is typically a suction side or downwind blade shell part. The first blade shell part 24 and the second blade shell part are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

FIG. 3a is a schematic diagram illustrating in a perspective view an exemplary mould system for moulding a blade shell of a wind turbine blade. The mould system 100 comprises a first mould 102 and a second mould 112. The first mould 102 is configured for manufacturing a first blade shell part of a wind turbine blade, such as an upwind shell part of the wind turbine blade. The second mould 112 is configured for manufacturing a second blade shell part of the wind turbine blade, such as a downwind shell part of the wind turbine blade. The mould system 100 further comprises a positioning device 130 configured for positioning the first mould 102 and the second mould 112 such that a first moulding side 104 of the first mould 102 is facing a second moulding side 114 of the second mould 112. The positioning device 130 may be configured for lifting and rotating the first mould 102.

Figure 3B:
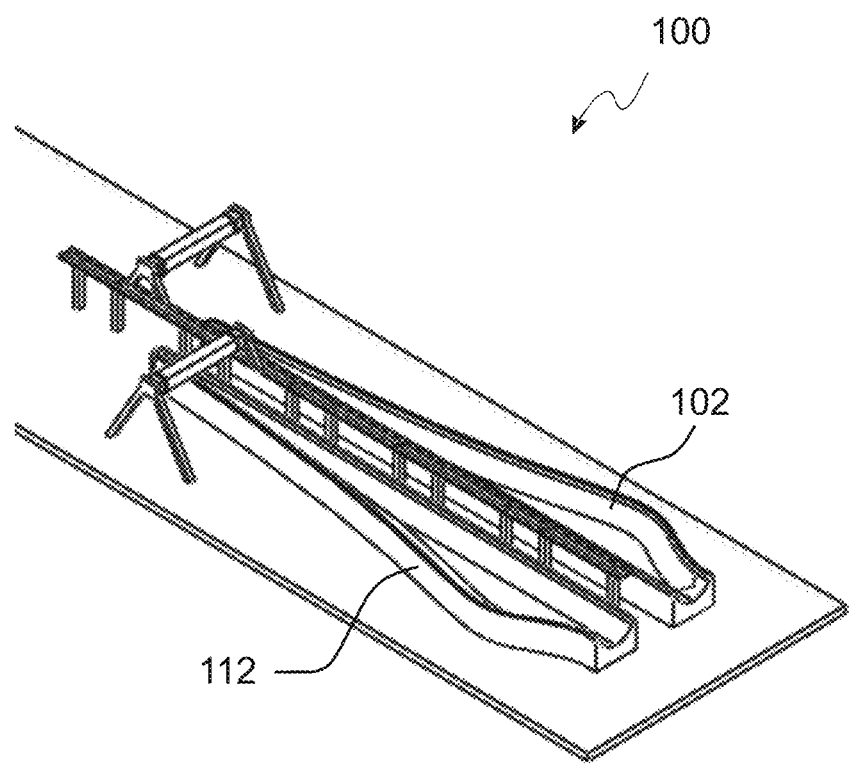

FIG. 3b is a schematic diagram illustrating in a cross sectional view the exemplary mould system, such as the mould system in the previous figures, for moulding a blade shell of a wind turbine blade. The mould system 100 comprises a first mould 102 and a second mould 112. The first mould 102 is configured for manufacturing a first blade shell part of a wind turbine blade, such as an upwind shell part of the wind turbine blade. The second mould 112 is configured for manufacturing a second blade shell part of the wind turbine blade, such as a downwind shell part of the wind turbine blade.

Figure 4:
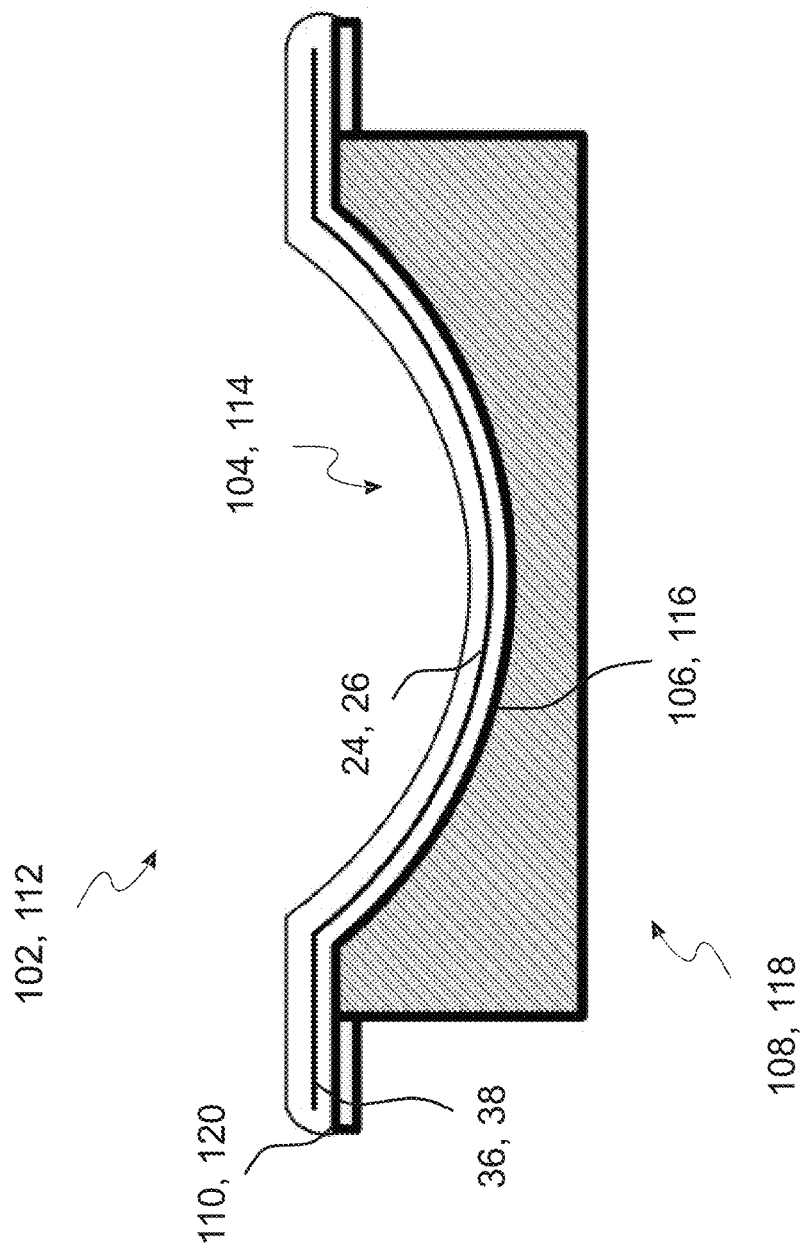
FIG. 4 is a schematic diagram illustrating an exemplary mould.

FIG. 4 is a schematic diagram illustrating an exemplary mould, such as the mould in the previous figures. The mould may be a first mould 102 for manufacturing a first blade shell part 24 of a wind turbine blade or a second mould 112 for manufacturing a second blade shell part 26 of the wind turbine blade.

The mould 102, 112 has a moulding side 104, 114, with a moulding surface 106, 116 that defines an outer shape of the blade shell part 24, 26. The mould 102, 112 has a non-moulding side 108, 118 opposite the moulding side 104, 114.

The mould 102, 112 comprises a mould flange 110, 120 along at least a part of the periphery of the moulding surface 106, 116. The mould flange 110, 120 provides a shell part flange 36, 38 on the blade shell part 24, 26.

Figure 5:
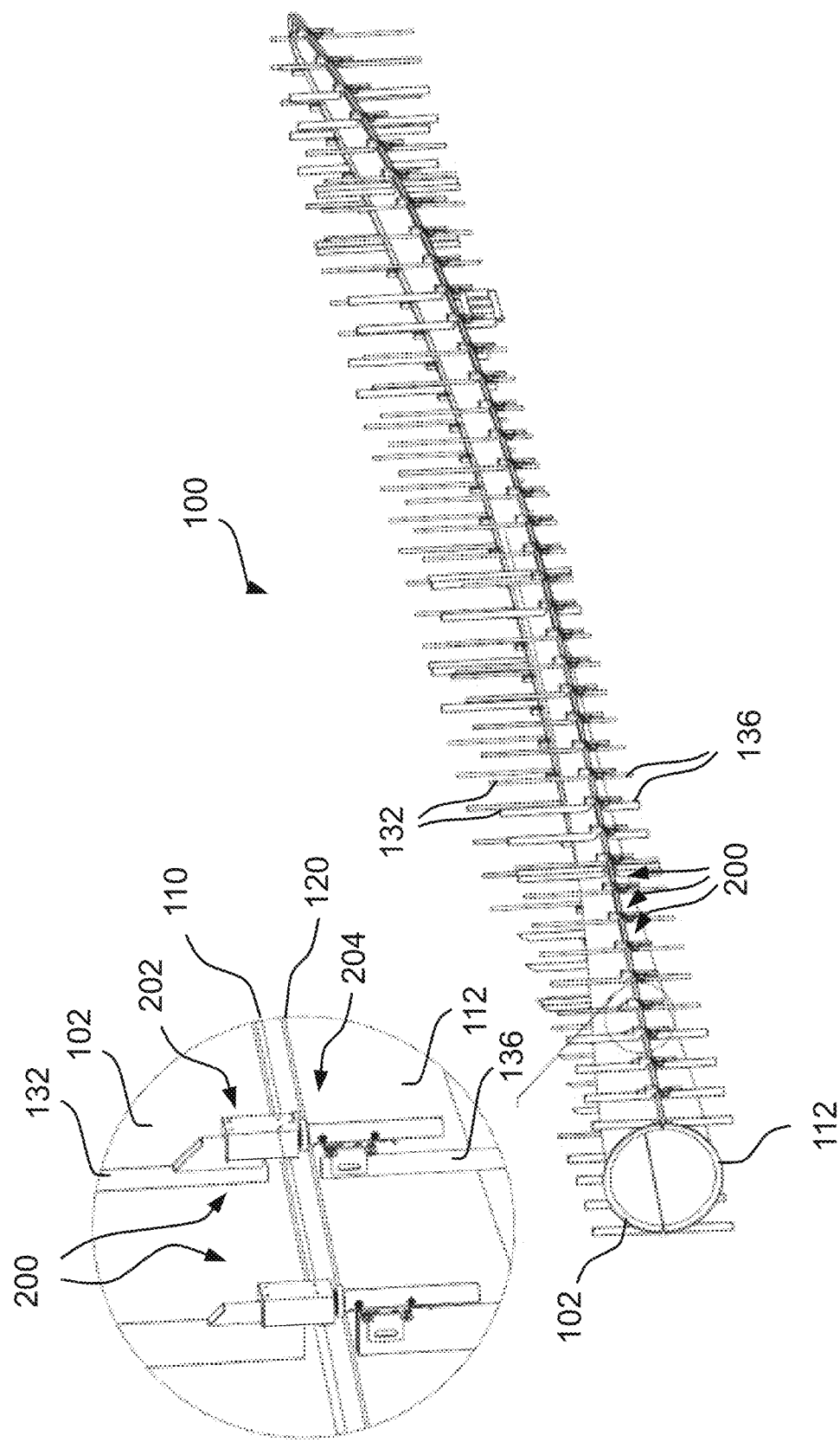
FIG. 5 is a schematic diagram illustrating a mould with exemplary mould aligner.

FIG. 5 is a schematic diagram illustrating an exemplary mould system, such as the mould system in the previous figures. The mould system 100 comprises a first mould 102 and a second mould 112. The mould system 100 comprises a plurality of first mould trestles 132 on the first mould 102 and a plurality of second mould trestles 136 on the second mould 112. For illustrative purposes, the remainder of the rack of the mould system is not illustrated in the figure. The mould system 100 comprises a plurality of mould aligners 200. The first mould trestles 132 and second mould trestles 136 are distributed evenly along the longitudinal direction of the moulds on both sides of the moulds. The mould aligners 200 are attached to at least some of the trestles and distributed evenly along the longitudinal direction of the moulds on both sides of the moulds.

The mould aligners 200 are attached to the first mould trestles 132 in one end and the second mould trestles 136 in the other end and spans over the first mould flange 110 and the second mould flange 120 when the first mould 102 and second mould 112 are closed together, such as in FIG. 5. The first mould trestles 132 and the second mould trestles 136 may be of different sizes, depending on the exact location of the trestle on the mould.

Figure 6:
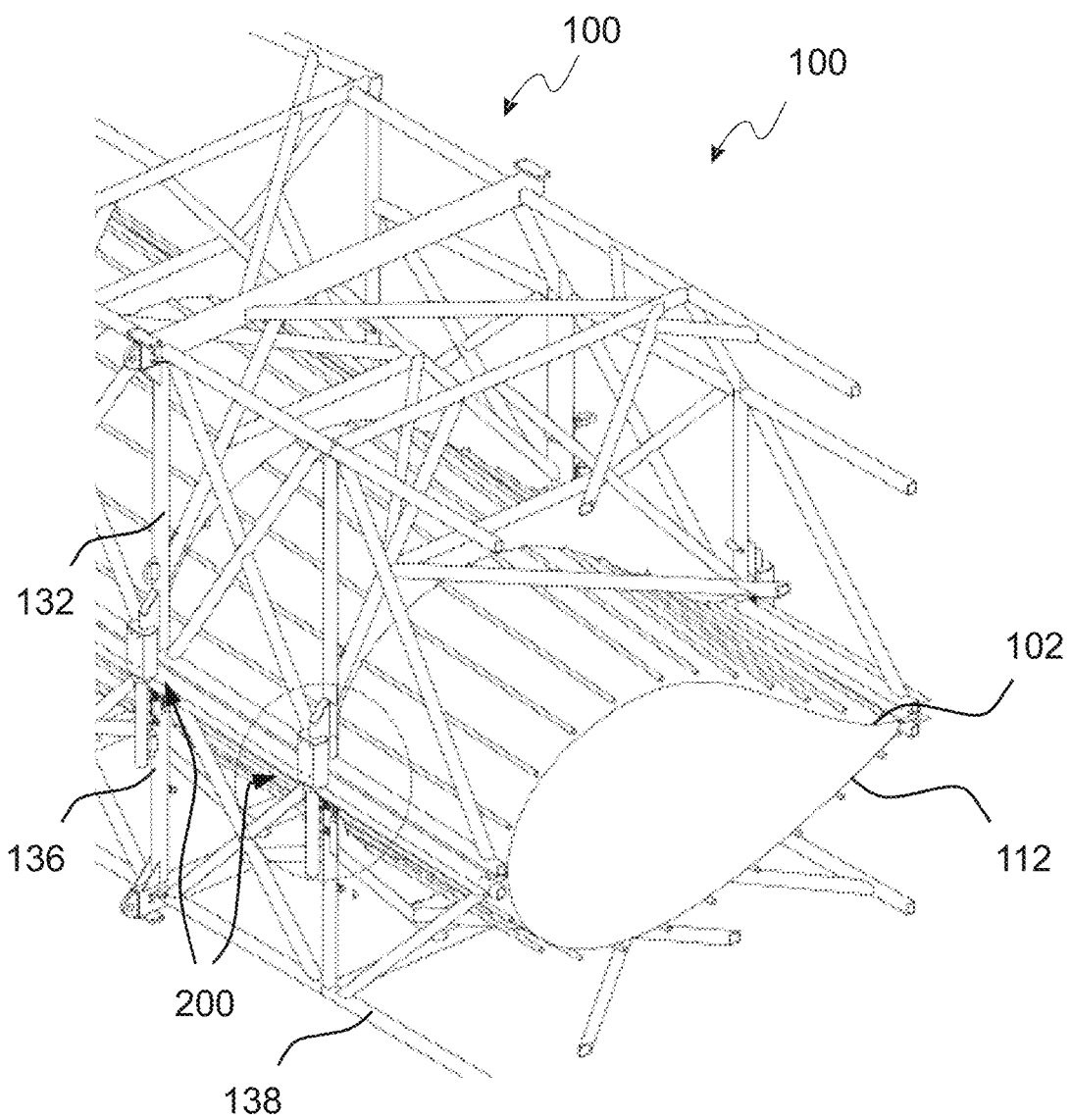
FIG. 6 is a schematic diagram illustrating a mould with exemplary mould aligner.

FIG. 6 is a schematic diagram illustrating an exemplary mould system, such as the mould system in the previous figures. The mould system 100 comprises a first mould 102 and a second mould 112. The first mould 102 and the second mould 112 are closed together in FIG. 6. The first mould 102 comprises a plurality of first mould trestles 132 and the second mould comprises a plurality of second mould trestles 136. The trestles are components of a rack 138 supporting the moulds. A plurality of mould aligners 200 are attached to the first mould trestles 132 and second mould trestles 136.

Figure 7:
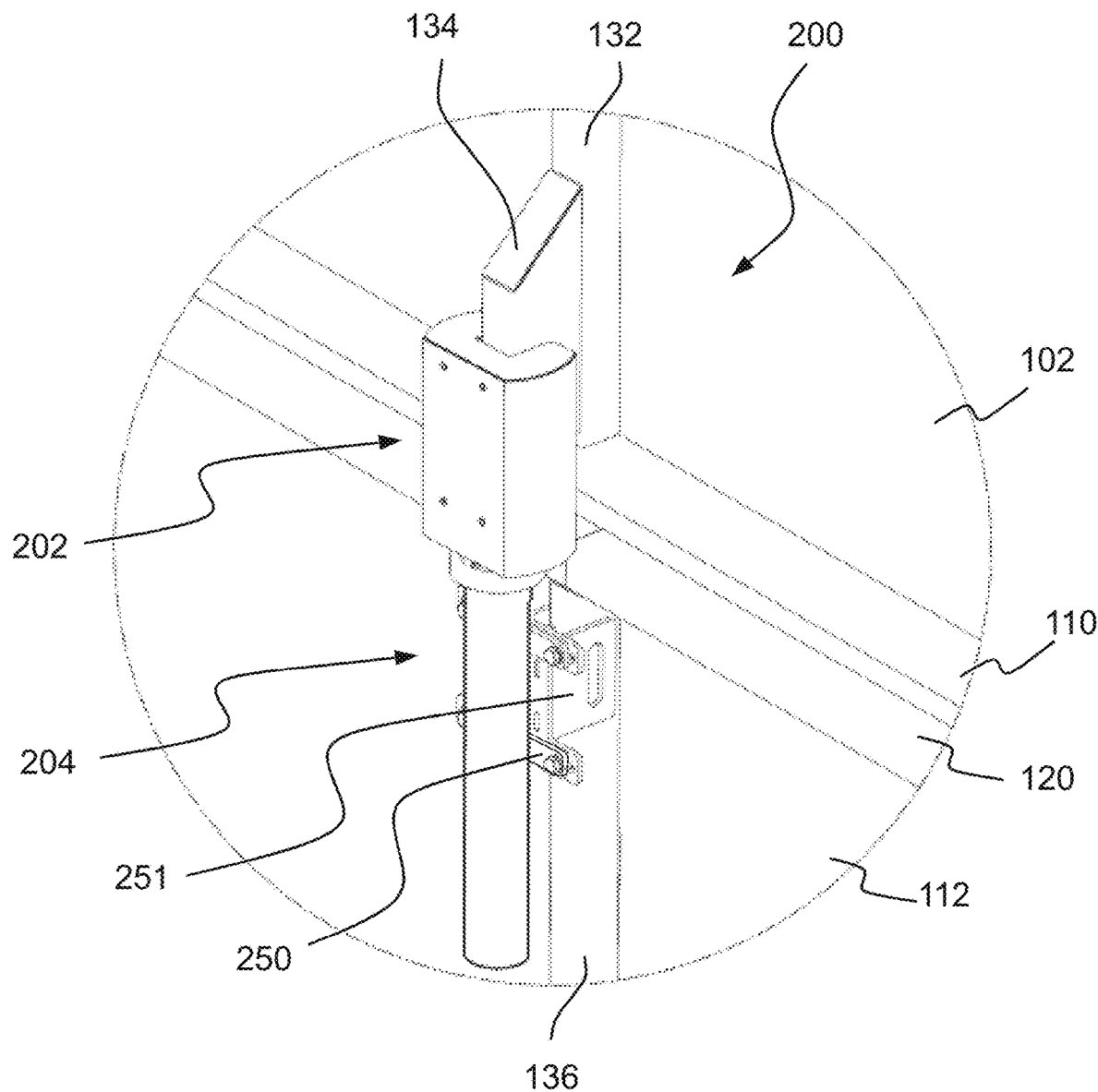
FIG. 7 is a schematic diagram illustrating an exemplary mould aligner.

FIG. 7 is a schematic diagram illustrating an exemplary mould aligner, such as the mould aligner in the previous figures. The mould aligner 200 comprises a first alignment segment 202 and a second alignment segment 204. The first alignment segment 202 is attached, such as fixedly attached, to the first mould trestle 132 of the first mould 102. The second alignment segment 204 is attached, such as fixedly attached, to the second mould trestle 136 of the second mould 112 in the other end. The second mould aligner 204 may be attached to the second mould trestle 136 by means of at least a first attachment bracket 250 and a second attachment bracket 251. The first mould 102 and the second mould 112 are closed together in FIG. 7. The mould aligner spans over the first mould flange 110 and the second mould flange 120. The first alignment segment 202 is attached to a first mould tube 134 attached to the first mould trestle 132. The first mould tubes 134 accommodate for differences in the size of the first mould trestles 132 along the first mould 102.

Figure 8A:
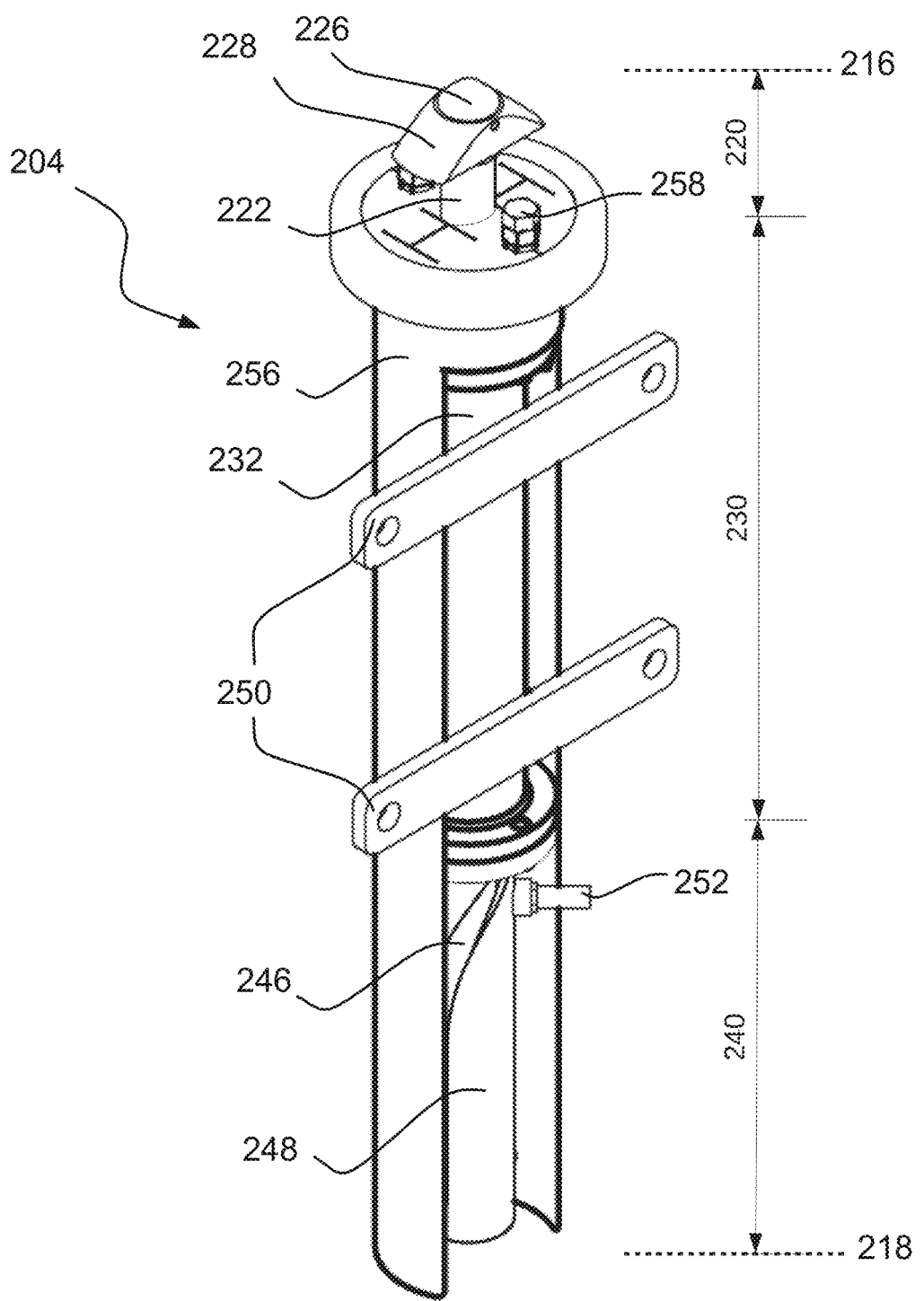
FIG. 8a-b is a schematic diagram illustrating an exemplary part of a mould aligner.

FIG. 8a is a schematic diagram illustrating an exemplary segment of a mould aligner, such as a second alignment segment from the previous figures. The second alignment segment 204 is seen detached from the second mould trestle of the second mould. The second alignment segment 204 extends from a second primary end 216 to a second secondary end 218. The second alignment segment 204 comprises a lock part 220, a cylinder part 230 and a guide part 240.

The lock part 220 comprises a locking element 228, a spinner element 226 and a first rod part 222. The first rod part 222 is part of a through-going piston rod (see for example 210 in FIG. 9b). The spinner element 226 is freely rotatable with respect to the locking element 228.

The cylinder part 230 comprises a barrel 232 and a second rod part (not shown). The barrel 232 may be part of a hydraulic cylinder. The barrel 232 is at least partly encircled by a protective cylinder case 256. The cylinder part 230 comprises first attachment brackets 250 for attaching the second alignment segment 204 to the second mould. The first attachment brackets 250 are attached to the barrel 232, e.g. by soldering. The cylinder part 220 comprises at least one height adjusting stop 258 for adjusting the space between the cylinder part 220 and the first mould aligner when the first and second mould aligner are interlocked. The space between the first and second alignment lock corresponds to the height of the adhesive, such as glue, between the first and second blade shell in the moulds.

The guide part 240 comprises a guide pipe 248. The guide pipe 248 comprises a guide slot 246. A third rod part (see 242 in FIG. 8b) is located inside the guide pipe 248. The guide part 240 comprises a sensor 252 for measuring the position of the third rod part (not shown).

Figure 8B:
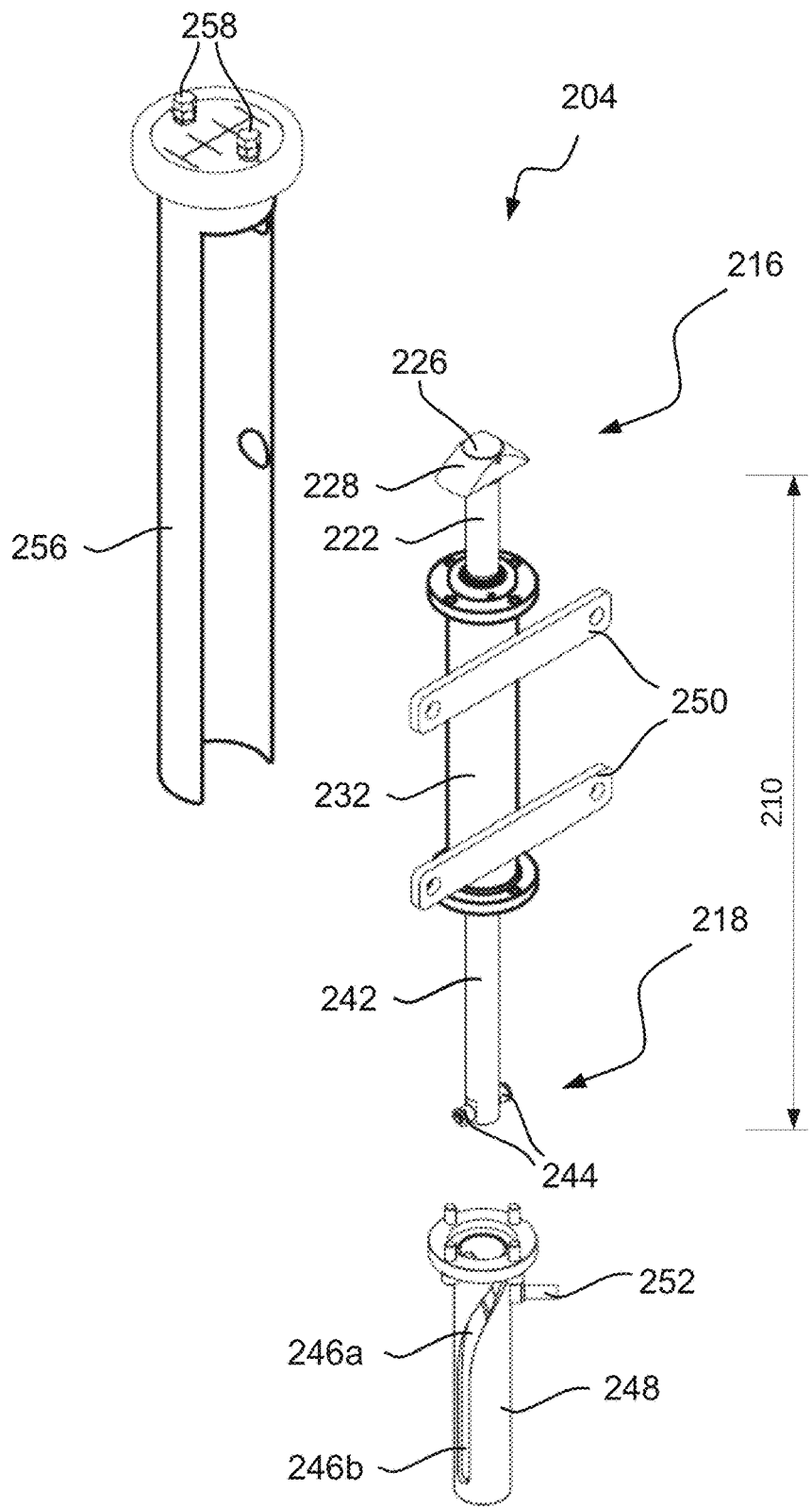

FIG. 8b is a schematic diagram illustrating an exemplary segment of a mould aligner, such as a second alignment segment from the previous figures. The second alignment segment 204 is shown in an exploded view. The second alignment segment 204 comprises a protective cylinder case 256 protecting the barrel 232, piston rod 210 and the guide pipe 248. The protective cylinder case 256 comprises at least one height adjusting stop 258 for adjusting the space between the cylinder part 220 and the first mould aligner when the first and second mould aligner are interlocked.

The second alignment segment 204 comprises a piston rod 210 comprising a first rod part 222, a second rod part (not shown) and a third rod part 242. The piston rod 210 extends through the barrel 232. The first rod part 222 protrudes from the barrel 232 towards the second primary end 216 and the third rod part 242 protrudes from the barrel 232 towards the second secondary end 218. The second rod part 234 is enclosed in the barrel 232. A spinner element 226 and a locking element 228 are arranged at the end of the first rod part 222. A guide pin 244 is arranged at the end of the third rod part 242 is. The guide pin protrudes from the third rod part 242 in a direction perpendicular to the longitudinal direction of the piston rod 210. The first attachment brackets 250 are attached to the barrel 232, e.g. by soldering.

The third rod part 242 is encircled by a guide pipe 248. The guide pipe 248 comprises guide slot 246 comprising a first guide slot part 246a and a second guide slot part 246b. The first guide slot part 246a extends helically about the longitudinal direction of the piston rod 210. The second slot part 246b extends in a direction substantially parallel to the longitudinal direction of the piston rod 210. The guide pin 244 of the third rod part 242 is configured to engage in the guide slot 246. The guide pipe 248 comprises a sensor 252 for measuring the position of the third rod part 242.

Figure 9A:
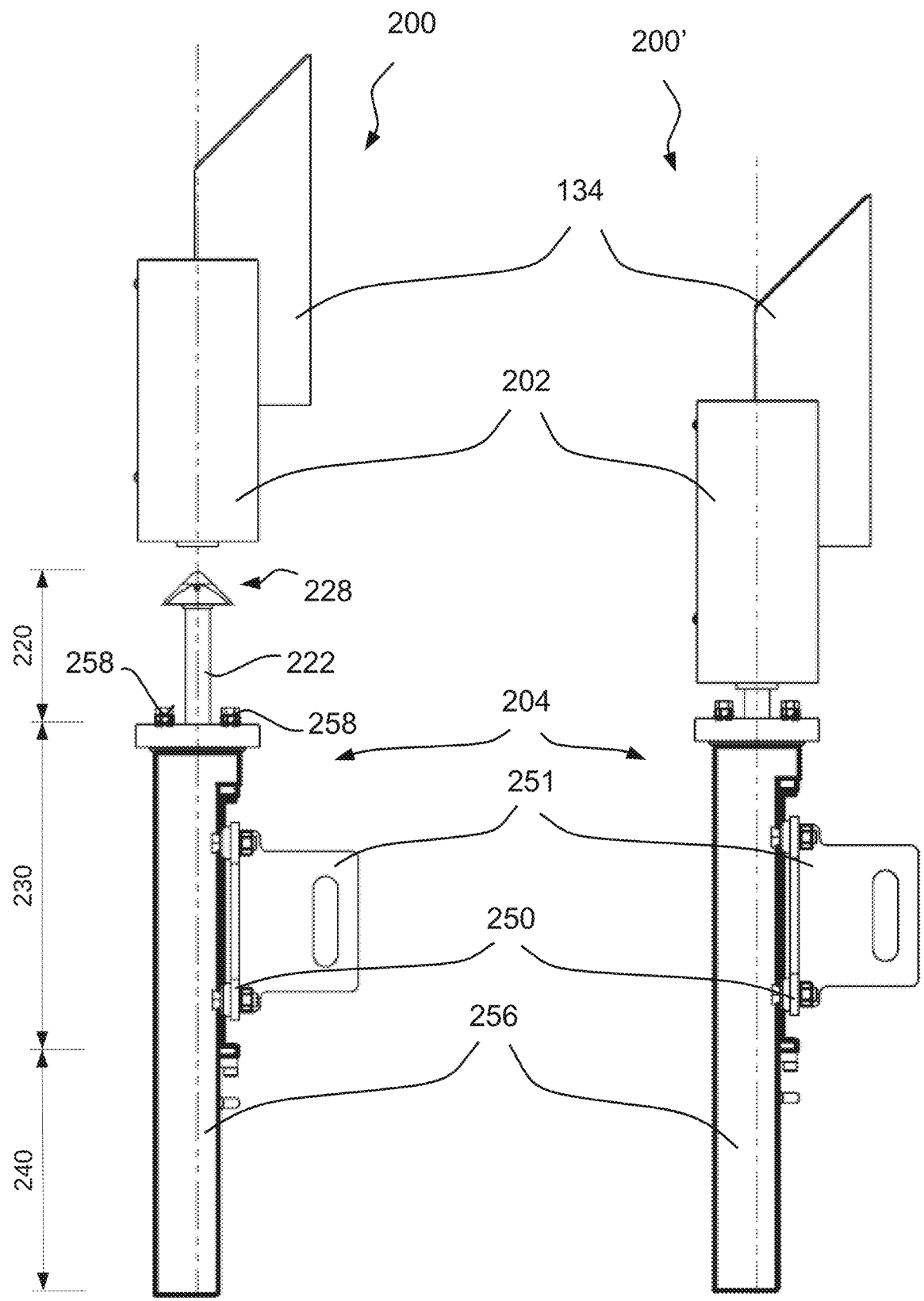
FIG. 9a-b is a schematic diagram illustrating an exemplary mould aligner.
Figure 9B:
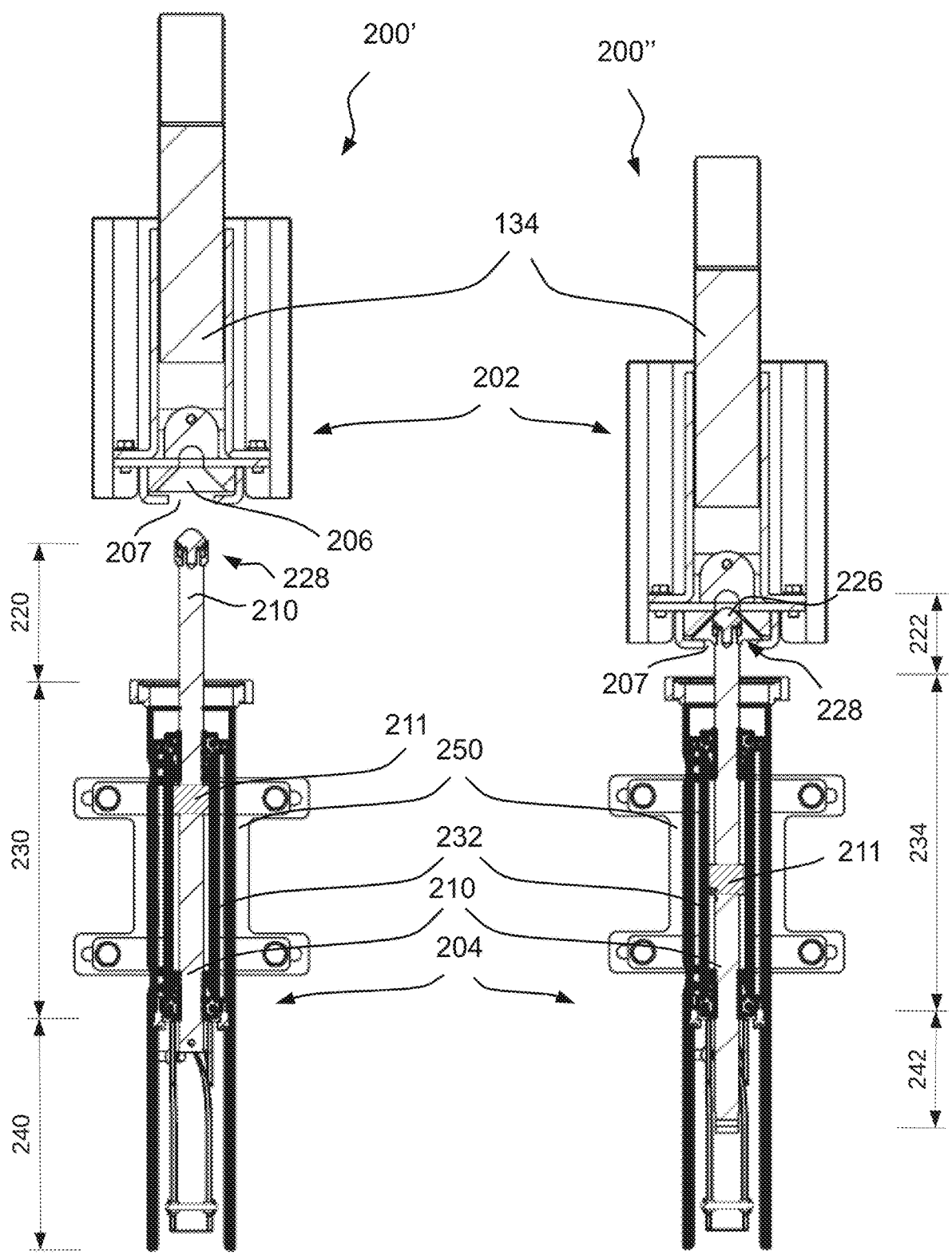

FIGS. 9a and 9b are schematic diagrams illustrating two exemplary mould aligners, such as the mould aligner from the previous figures. The FIGS. 9a and 9b show one mould aligner 200' where the first alignment segment 202 and the second alignment segment 204 are separated, and one mould aligner 200" where the first alignment segment 202 and the second alignment segment 204 are interlocked.

In FIG. 9a the mould aligners are seen in a plane corresponding to the cross sectional plane of the moulds. The first attachment brackets 250 of the second alignment segment 204 are attached to a second attachment bracket 251. The second attachment bracket 251 may be a part of the second mould trestle (see e.g. FIG. 7) of the second mould or be attached to the second mould trestle, e.g. by soldering.

In FIG. 9b the mould aligners are seen in a plane parallel to the longitudinal sectional view of the moulds. The first alignment segment 202 and the second alignment segment 204 are seen in a cross section. The cylinder part 230 shows the barrel and the piston rod 210 comprising a piston 211. The hydraulic cylinder may use pressurized fluid to drive the piston rod 210. The pressurized fluid may be oil. The hydraulic may be single acting or dual acting.

The first alignment segment 202 and the second alignment segment 204 are seen separated for the first mould aligner 200'. The first alignment segment 202 and the second alignment segment 204 are seen interlocked for the second mould aligner 200". The locking element 228 is in a first angular position for the first mould aligner 200. The first alignment segment 202 will be lowered until the locking element 228 has entered the locking cavity 206 through the opening slot 207. After the locking element 228 has entered the locking cavity 206 the first alignment segment 202 will continue to be lowered. The piston rod 210 will be lowered in the second alignment segment 204 and rotated, such that the locking element 228 rotates from a first angular position to a second angular position, due to the guide slot and guide pin configuration. The piston rod 210 may be rotated at the beginning of the lowering of the piston rod 210 or at the end of the lowering of the piston rod 210. The second mould aligner 200" shows the first alignment segment 202 lowered, the piston rod 210 rotated and the locking element 228 in the second angular position. The spinner element 226 will be the contact point between the second alignment segment 204 and the first alignment segment 202. The spinner element 226 rotates freely with respect to the locking element 228, such that the friction between the locking element 228 and the locking cavity 206 is reduced.

The piston rod 210 may be lowered by the weight of the mould transferred through the first alignment segment 202. The piston rod 210 may, after the locking element 228 has been rotated to the second angular position, pull the first alignment segment 202 towards the second alignment segment 204.

Figure 10:
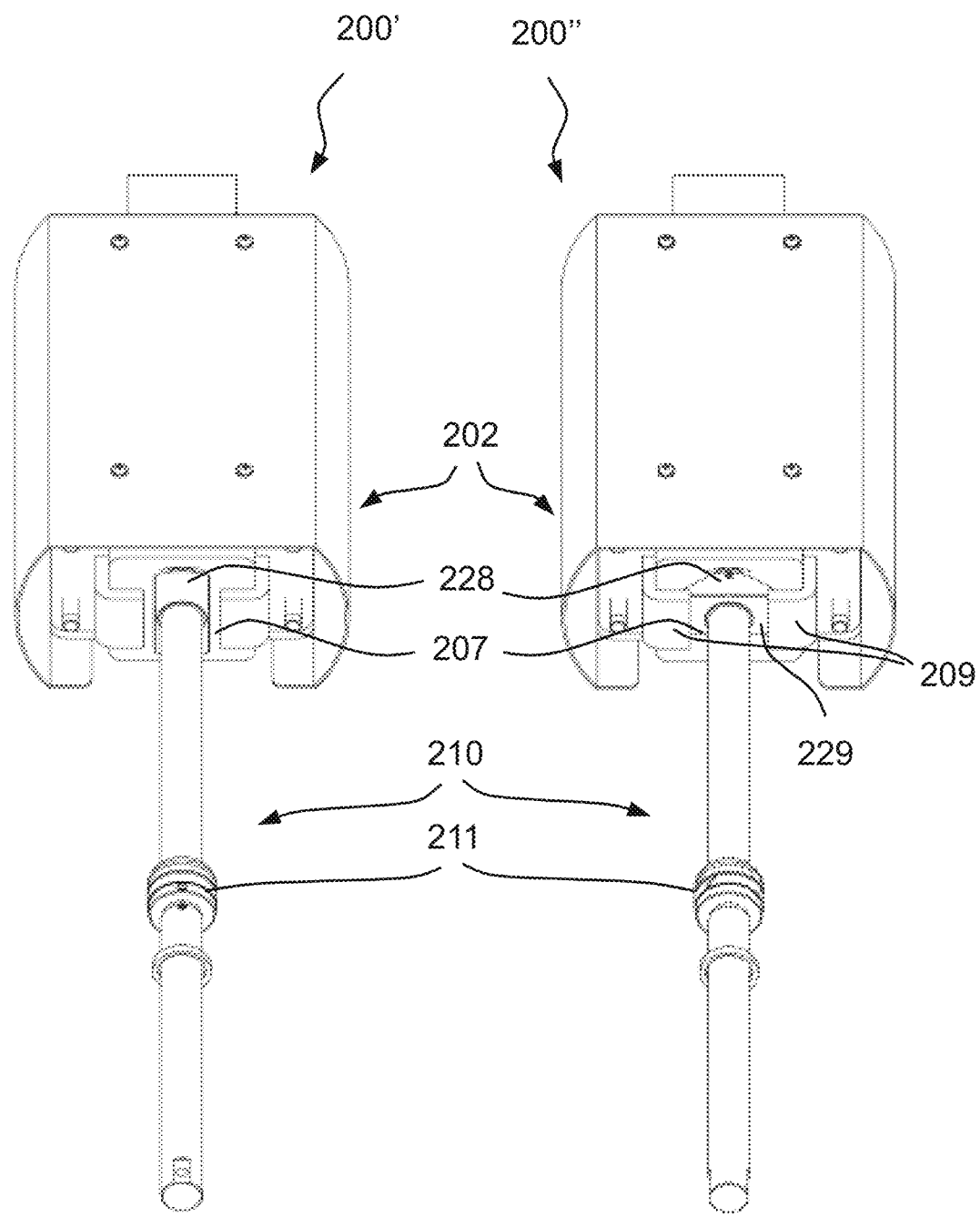
FIG. 10 is a schematic diagram illustrating an exemplary part of a mould aligner.

FIG. 10. is a schematic diagram illustrating an parts of an exemplary mould aligner, such as the mould aligner from the previous figures. FIG. 10 shows part of a first mould aligner 200' and parts of a second mould aligner 200", i.e. the first alignment segment 202 and the piston rod 210 comprising a piston 211 from the second alignment segment. For illustrative purposes, the other parts of the second alignment segment are not shown. The first mould aligner shows the locking element 228 in a first angular position. In the first angular position the locking element 228 may enter the locking cavity of the first alignment segment 220 through the opening slot 207. The second mould aligner 200" shows the locking element 228 in the second angular position, where the locking surface 229 of the locking element 228 is in contact with at least one projection 209 extending across the locking cavity of the second alignment segment 202, hereby locking the first alignment segment 202 and the second alignment segment. The second angular position may be at a 90° rotation of the locking element 228 relative to the first angular position.

FIG. 11a-11d are schematic diagrams illustrating the alignment and locking method of an exemplary mould system. The method comprises providing a mould system comprising a mould, such as the second mould 112, and providing an alignment segment, such as the second alignment segment 204 on the second mould 112 (such as in FIG. 11a). The second alignment segment 204 is provided in an extended position where the locking element is in the first angular position.

Figure 11A:
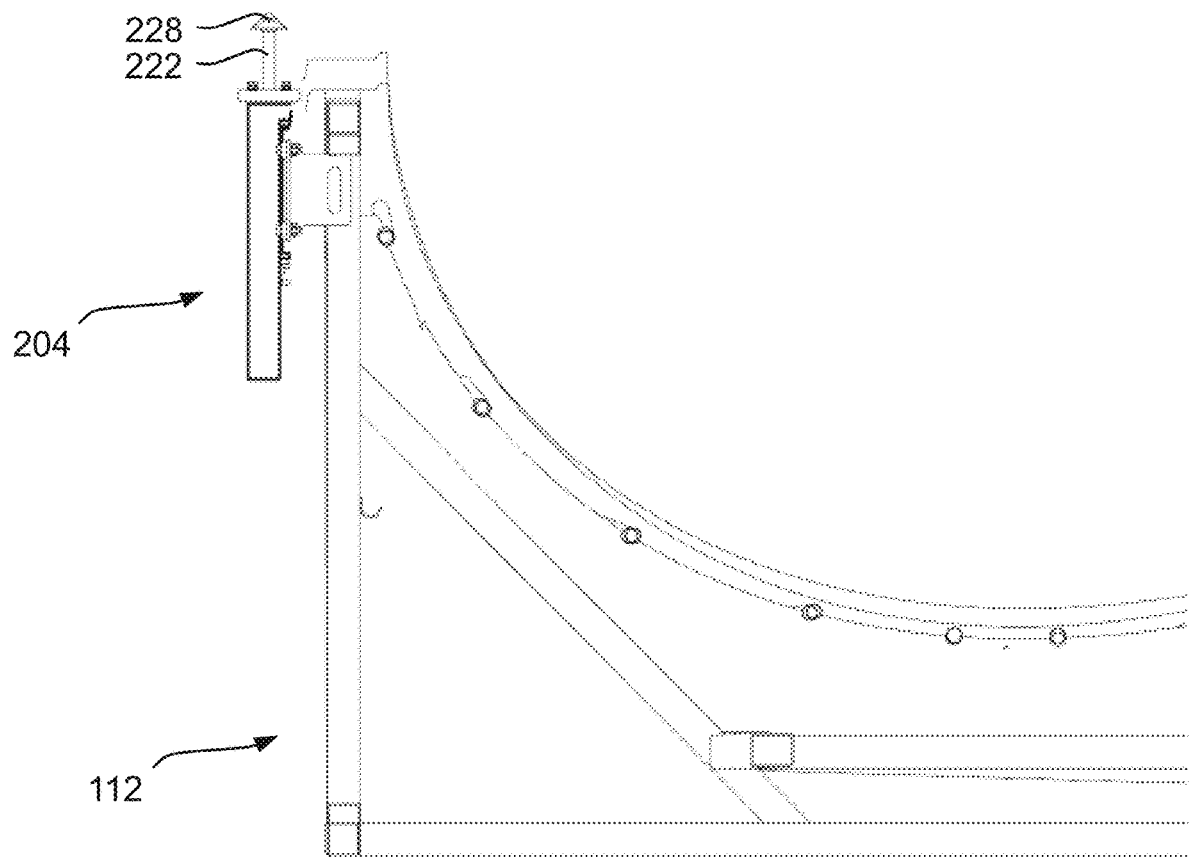
FIG. 11a-d is a schematic diagram illustrating an exemplary method of aligning and locking moulds.
Figure 11B:
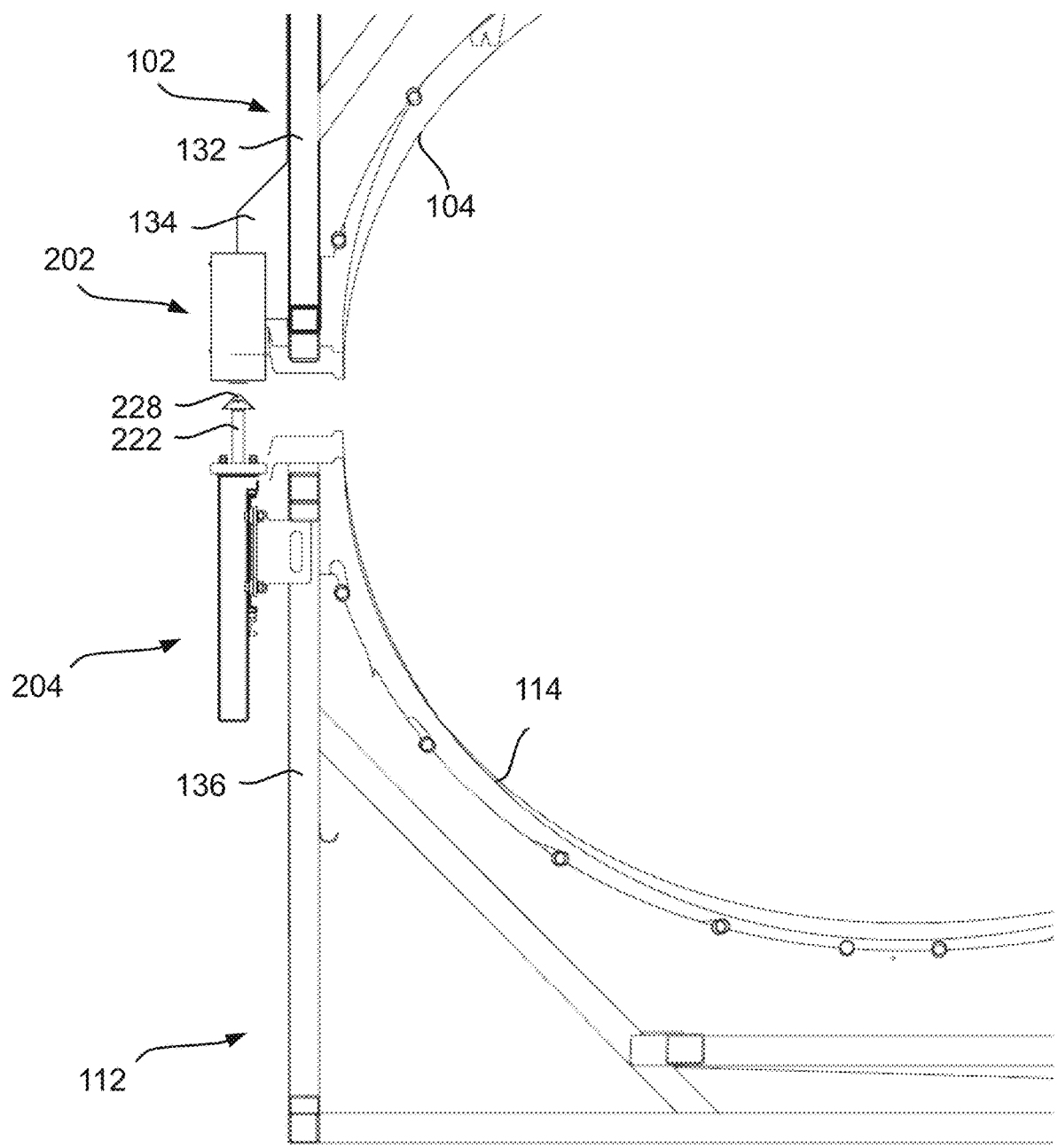

The method comprises providing another mould, such as the first mould 102, and another alignment segment, such as the first alignment segment 202 (such as in FIG. 11b). The first mould 102 may be turned by hinges (see e.g. FIG. 3a) to face the second mould 112. The method comprises aligning the first mould 102 and the second mould 112 by providing the moulds such that the second moulding side 114 of the second mould 112 and the first moulding side 104 of the first mould 102 are facing each other.

Figure 11C:
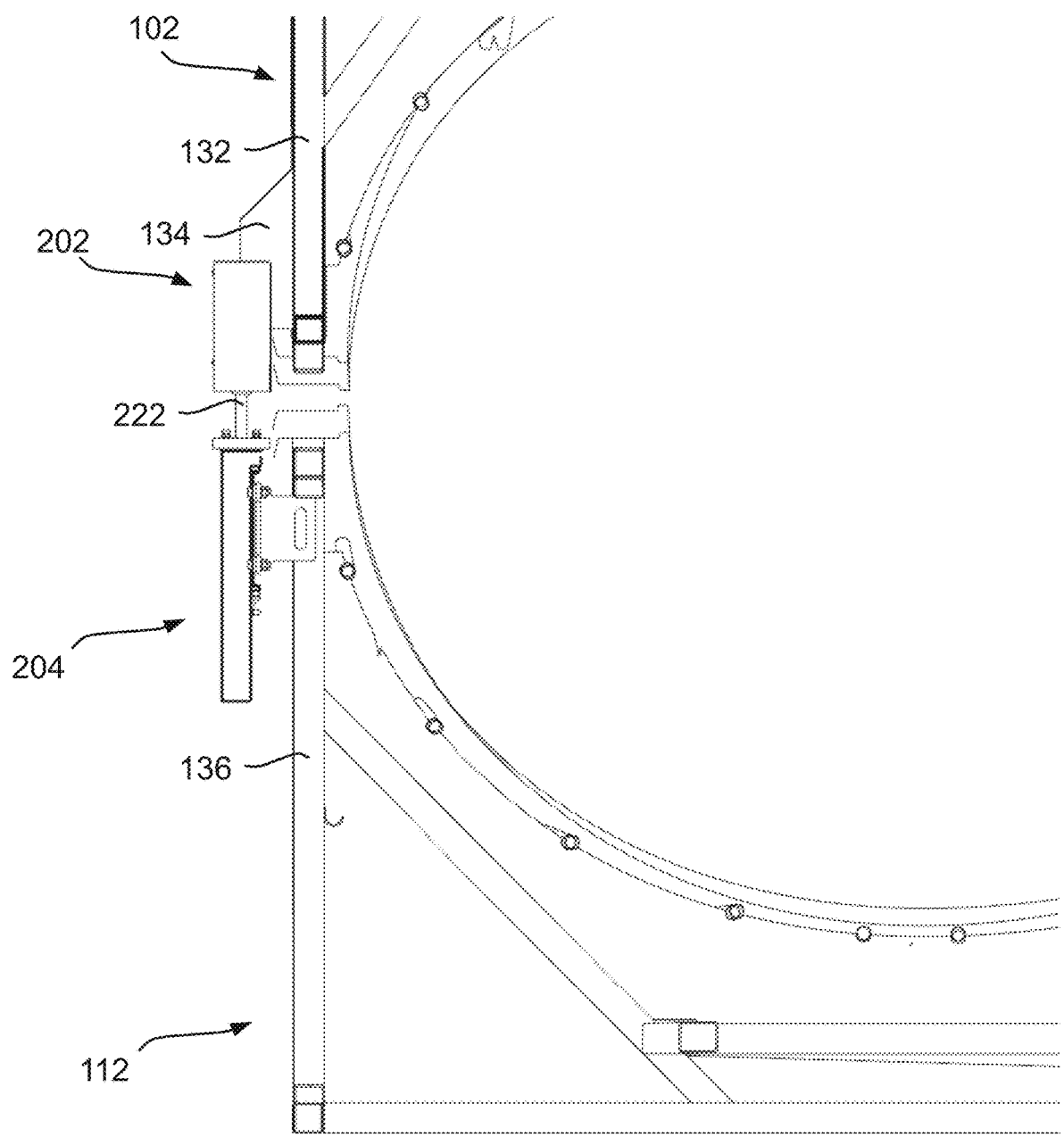
Figure 11D:
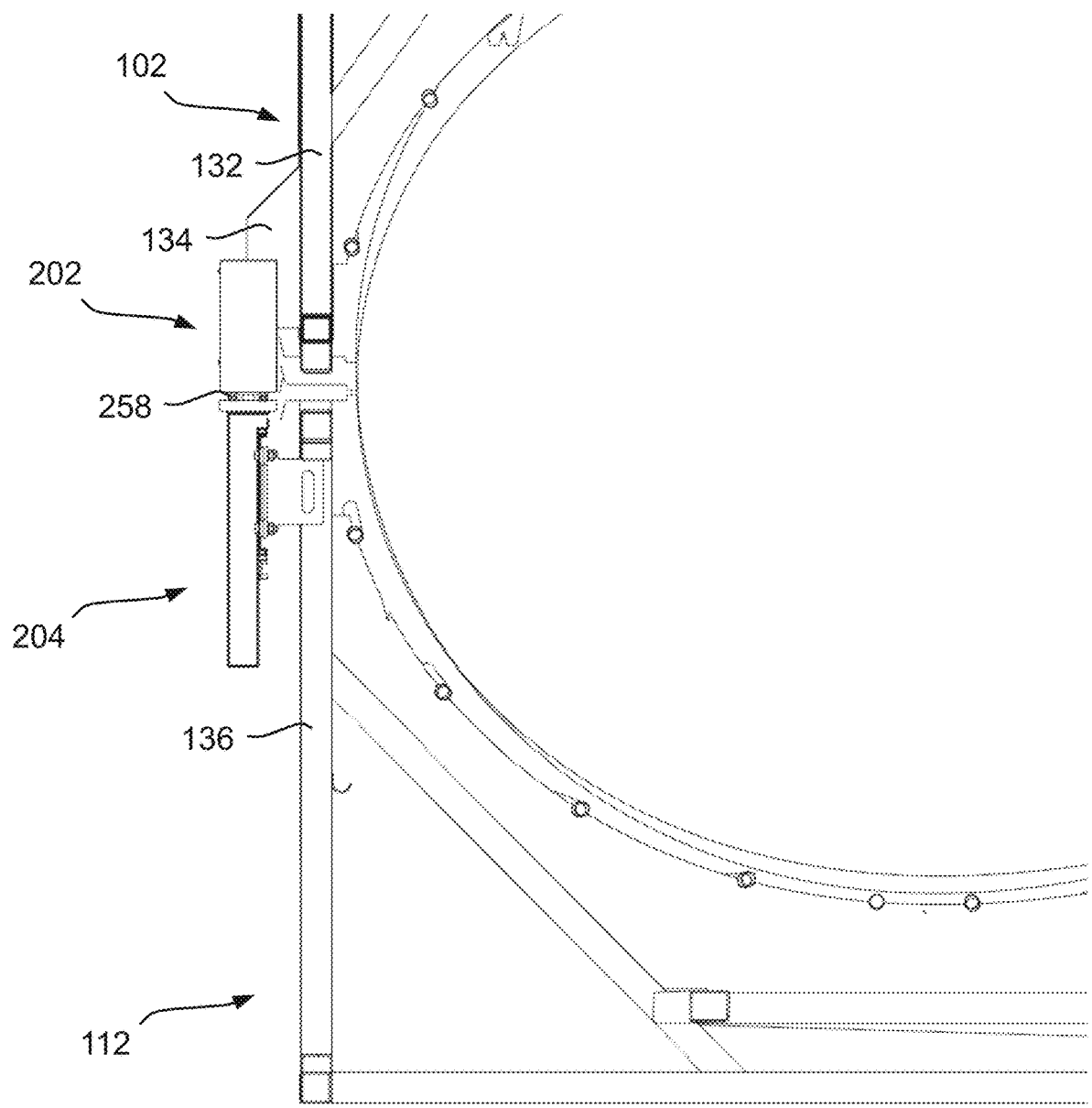

The method comprises aligning the moulds by lowering the first mould 102 (such as in FIG. 11c). The first alignment segment and the second alignment segment are brought into engagement, i.e. the locking element of the second alignment segment 204 enters the locking cavity of the first alignment segment 202. A low counter pressure from the second alignment segment 204 may be applied to keep the locking element up against the surface of the locking cavity of the first alignment segment 102.

The method comprises aligning and locking the moulds by lowering the first mould 102 (such as in FIG. 11d) until the locking element is rotated into the second angular position and the second alignment segment is in a retracted position. The order of the rotation and retraction may be changed, i.e. the locking element may be rotated before the second alignment segment is in a retracted position, or the second alignment segment be in a partly retracted position before the locking element is rotated. After the locking element has been retracted the second alignment segment 204 may be able to pull the first alignment segment 202 towards the second alignment segment 204, thereby locking the first mould 102 to the second mould 112. The first mould 102 and the second mould 112 are held together by adhesive, e.g. glue. The height adjusting stops 258 may be adjusted to determine the glue height between the first mould 102 and the second mould 112, e.g. the height of the height adjusting stops may be 10-50 mm, such as 30 mm.

Figure 12:
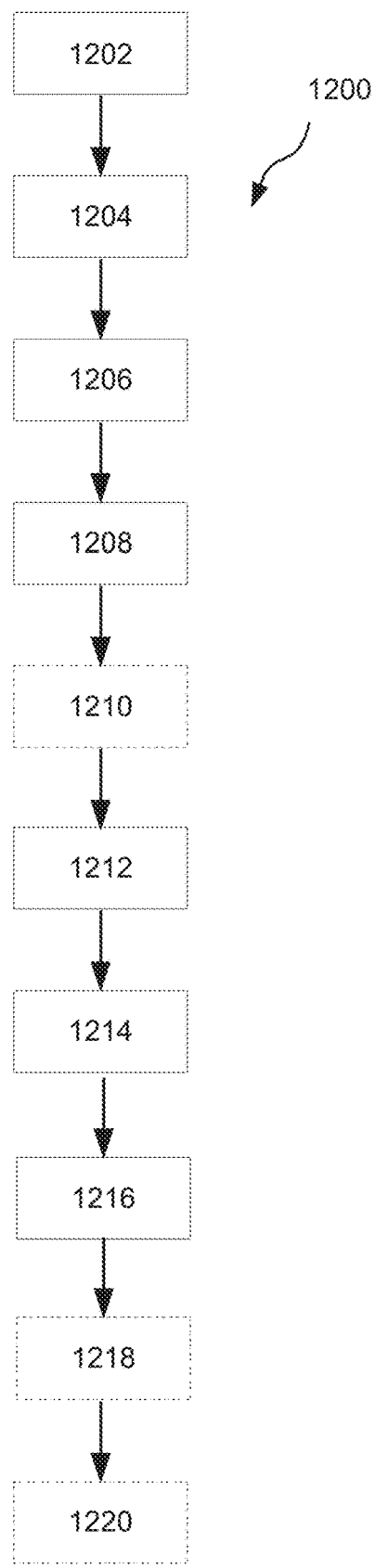
FIG. 12 is a block diagram of an exemplary method of aligning and locking moulds.

FIG. 12 is a block diagram of an exemplary method for aligning and locking a first mould and a second mould of a wind turbine blade. The method comprises providing 1202 a first mould, providing 1204 a first alignment segment on the first mould, providing 1206 a second mould and providing 1208 a second alignment segment on the second mould. Providing 1208 the second alignment segment comprises providing the second alignment segment in an extended position with the locking element in a first angular position.

The method alternatively comprises adjusting 1210 at least one height adjusting stop, such that the height of the height adjusting stop corresponds a desired height of the adhesive, e.g. glue, on a flange of a shell part in a mould.

The method comprises bringing 1212 the first alignment segment and the second alignment segment into engagement, wherein bringing 1212 the segments into engagement comprises lowering the first alignment segment onto the second alignment segment such that the locking element enters a locking cavity through a opening slot in the first alignment segment.

The method comprises aligning the first mould and the second mould, wherein aligning the moulds comprises lowering 1214 the first mould towards the second mould. The first mould is lowered 1214 by means of the hydraulic cylinder. The method comprises locking 1216 the first mould and the second mould, wherein locking the moulds comprises rotating the locking element to a second angular position, such that the first alignment segment and second alignment segment are interlocked. The method may further comprise pulling 1218 the first mould and the second mould together by pulling the first alignment segment towards the second alignment segment by means of the hydraulic cylinder. Aligning and locking the first mould on top of the second mould may comprise pulling 1218 or lowering 1214 the first mould until the first mould rests 1220 on the height adjusting stop.

When the adhesive between the shell parts in the moulds has been cured, the first mould may be elevated from the second mould by elevating the first alignment segment. The piston rod will be extended and rotated such that the locking element of the piston rod may be released from the locking cavity of the first alignment segment. After release the piston rod may be retracted to a storing position, until the method starts from the beginning.

It should be noted that the order of the steps of the method may be interchanged and/or some of the steps may be performed simultaneously. For example, while locking 1214 the moulds by rotating the locking element is illustrated as being performed after lowering 1212 the first mould, it will be understood that locking 1214 the moulds by rotating the locking element may alternatively be performed prior to lowering 1212 the first mould.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
16 blade root
18 leading edge
20 trailing edge
24 first blade shell part
26 second blade shell part
28 bond lines/glue joints
30 root region
32 transition region
34 airfoil region
36 first shell part flange
38 second shell part flange
100 mould system
102 first mould
103 first mould frame structure
104 first moulding side
106 first moulding surface
108 first non-moulding side
110 first mould flange
112 second mould
113 second mould frame structure
114 second moulding side
116 second moulding surface
118 second non-moulding side
120 second mould flange
130 positioning device
132 first mould trestle
134 first mould tube
136 second mould trestle
138 rack
200 mould aligner
200' first mould aligner
200" second mould aligner
202 first alignment segment
204 second alignment segment
206 locking cavity
207 opening slot
209 projection
210 piston rod
211 piston
212 first primary end
214 first secondary end
216 second primary end
218 second secondary end
220 lock part
222 first rod part
226 spinner element
228 locking element
229 locking surface
230 cylinder part
232 barrel
234 second rod part 240 guide part
242 third rod part
244 guide pin
246 guide slot
246a first slot part
246b second slot part
248 guide pipe
250 first attachment bracket
251 second attachment bracket
252 sensor
256 protective cylinder case
258 height adjusting stop
M mould aligner axis
1200 method
1202 providing a first mould
1204 providing a first alignment segment
1206 providing a second mould
1208 providing a second alignment segment
1210 adjusting height adjusting stop
1212 aligning alignment segments
1214 lowering mould
1216 locking moulds
1218 pulling mould
1220 resting mould

The invention claimed is:

1. A mould aligner for aligning and locking a first mould and a second mould for moulding shell parts of a wind turbine blade, the mould aligner comprising:
a first alignment segment extending along a first mould aligner axis from a first primary end to a first secondary end, and being configured to be attached to the first mould, wherein the first alignment segment comprises a locking cavity; and
a second alignment segment extending along a second mould aligner axis from a second primary end to a second secondary end, and being configured to be attached to the second mould, wherein the second alignment segment comprises:
a hydraulic cylinder, the hydraulic cylinder comprising a barrel and a piston rod, the piston rod being axially displaceable and rotatable with respect to the barrel;
a lock part comprising a first rod part and a locking element being provided on the first rod part, the first rod part being configured for being received in and engaged in the locking cavity of the first alignment segment;
a cylinder part comprising the barrel and a second rod part comprising a piston; and
a guide part comprising a third rod part, a guide pin and a guide slot, the guide pin engaging the guide slot,
wherein the piston rod of the hydraulic cylinder of the second alignment segment is adjustable and movable between a retracted state and an extended state and vice versa, and the engagement between the guide pin and the guide slot is configured for providing an angular rotation of the piston rod during a portion of said movement, and
wherein the lock part further comprises a spinner element, the spinner element being freely rotatable with respect to the locking element about an axis parallel to the second mould aligner axis for reducing friction between the locking element and the locking cavity.

2. The mould aligner according to claim 1, wherein the second alignment segment in a retracted state has a retracted length between the second primary end and the second secondary end and in an extended state has an extended length between the second primary end and the second secondary end, the extended length being longer than the retracted length, wherein the hydraulic cylinder is configured to adjust the second alignment segment along the second mould aligner axis between the retracted state and the extended state.

3. The mould aligner according to claim 1, wherein the guide slot comprises a first slot part and a second slot part, wherein the first slot part extends helically about the second mould alignment axis and the second slot part extends in a direction substantially parallel to the second mould aligner axis.

4. The mould aligner according to claim 1, wherein the guide slot is located in a guide pipe and the guide pin is attached to the third rod part, and wherein the guide pin is in engagement with the guide slot in the guide pipe, the guide slot defining a path of movement of the third rod part.

5. The mould aligner according to claim 1, wherein the locking element has an elongated cross sectional shape in a plane perpendicular to the second mould aligner axis, the elongated cross sectional shape having a length and a width, wherein the length is longer than the width.

6. The mould aligner according to claim 1, wherein the first alignment segment comprises an opening slot at the first secondary end.

7. The mould aligner according to claim 1, wherein the locking cavity of the first alignment segment is configured to receive the locking element in a first angular position and to lock the locking element in a second angular position, wherein locking the locking element comprises a locking surface being in contact with an inner surface of at least one projection extending across the locking cavity, thereby preventing retraction of the locking element from the locking cavity.

8. The mould aligner according to claim 1, wherein the locking element has a shape as a cone and the locking cavity has a conical shape.

9. The mould aligner according to claim 1, wherein the hydraulic cylinder allow turning of the locking element from a first angular position to a second angular position, thereby locking the locking element in the locking cavity, the angular distance between the first angular position and the second angular position being between 10° and 170°.

10. The mould aligner according to claim 9, wherein the angular distance between the first angular position and the second angular position is 90°.

11. A mould system for moulding a blade shell of a wind turbine blade, the mould system comprising:
a first mould for manufacturing a first blade shell part of the wind turbine blade; and
a second mould for moulding a second blade shell part of the wind turbine blade, the first mould and second mould extending along a longitudinal axis,
wherein the first mould has a first moulding side with a first moulding surface that defines an outer shape of the first blade shell part and a first non-moulding side opposite the first moulding side,
wherein the second mould has a second moulding side with a second moulding surface that defines an outer shape of the second blade shell part and having a second non-moulding side opposite the second moulding side,
wherein the mould system is configured to position the first mould and the second mould such that the first moulding side is facing the second moulding side and such that the first blade shell part may be adhered to the second blade shell part so as to form the blade shell of the wind turbine blade, and wherein the mould system further comprises a plurality of mould aligners according to claim 1 being distributed along at least a part of a lateral side of at least one of the first and second moulds.

12. The mould system according to claim 11, wherein the mould system is configured to align and lock the first mould on top of the second mould, such that the first moulding side is facing the second moulding side.

13. The mould system according to claim 11, wherein the mould aligners are arranged such that a first mould aligner axis of the first alignment segment is perpendicular to the longitudinal axis of the first mould and a second mould aligner axis of the second alignment segment is perpendicular to the longitudinal axis of the second mould.

14. A method for aligning and locking a first mould and a second mould of a mould system for moulding shell parts of a wind turbine blade, the method comprising:
providing a first mould;
providing a first alignment segment on the first mould, wherein the first alignment segment extends along a first mould aligner axis from a first primary end to a first secondary end, the first alignment segment being configured to be attached to the first mould, wherein the first alignment segment comprises a locking cavity;
providing a second mould;
providing a second alignment segment on the second mould, wherein the second alignment segment extends along a second mould aligner axis from a second primary end to a second secondary end, wherein the second mould comprises a barrel and a piston rod, and wherein when the second alignment segment is in an extended position, a locking element on the piston rod is in a first angular position, wherein the piston rod is axially displaceable and rotatable with respect to the barrel, the second alignment segment comprising a lock part comprising a first rod part and a locking element provided on the first rod part, the first rod part being configured for being received in and engaged in the locking cavity of the first alignment segment, the second alignment segment further comprising a cylinder part comprising the barrel and a second rod part comprising a piston, the second alignment segment further comprising a guide part comprising a third rod part, a guide pin and a guide slot, the guide pin engaging the guide slot, wherein the piston rod is adjustable and movable between a retracted state and an extended state and vice versa, and the engagement between the guide pin and the guide slot is configured for providing an angular rotation of the piston rod during a portion of said movement;
bringing the first alignment segment and the second alignment segment into engagement comprising lowering the first alignment segment onto the second alignment segment such that the locking element enters the locking cavity through an opening slot in the first alignment segment;
aligning the first mould and the second mould, wherein aligning the moulds comprises lowering the first mould towards the second mould; and
locking the first mould and the second mould, wherein locking the moulds comprises rotating the locking element to a second angular position, such that the first alignment segment and second alignment segment are interlocked,
wherein the lock part comprises a spinner element, the spinner element being freely rotatable with respect to the locking element about an axis parallel to the second mould aligner axis for reducing friction between the locking element and the locking cavity.

15. The method according to claim 14, wherein the method further comprises pulling the first mould and the second mould together by pulling the first alignment segment towards the second alignment segment.

16. The method according to claim 14, wherein the second alignment segment comprises at least one height adjusting stop configured to stop the translational movement of the first mould towards the second mould, and wherein aligning and locking the first mould on top of the second mould comprises adjusting the height adjusting stop and pulling or lowering the first mould until the first mould rests on the height adjusting stop.

* * * * *